(No Model.)  2 Sheets—Sheet 1.

H. SCHULZE-BERGE.
GEARING.

No. 305,715. Patented Sept. 23, 1884.

WITNESSES:
W. B. Corwin
J. K. Smith

INVENTOR
Hermann Schulze-Berge
BY ATTORNEY,
Bakewell & Kerr (No Model.) 2 Sheets—Sheet 2.

H. SCHULZE-BERGE.
GEARING.

No. 305,715. Patented Sept. 23, 1884.

WITNESSES:
W. B. Corwin
J. K. Smith

INVENTOR
Hermann Schulze-Berge
BY
Bakewell & Kerr
ATTORNEY

UNITED STATES PATENT OFFICE.

HERMANN SCHULZE-BERGE, OF ROCHESTER, PENNSYLVANIA.

GEARING.

SPECIFICATION forming part of Letters Patent No. 305,715, dated September 23, 1884.

Application filed April 11, 1884. (No model.)

*To all whom it may concern:*

Be it known that I, HERMANN SCHULZE-BERGE, of Rochester, in the county of Beaver and State of Pennsylvania, have invented a new and useful Improvement in Gearing; and I do hereby declare the following to be a full, clear, and exact description thereof.

In an application, No. 117,135, for Letters Patent for gearing device filed by me on January 11, 1884, I have shown and described globular gear-wheels having a pitch-line of teeth coincident with a true sphere. Such gearing is open to the objection that if the shafts to be connected are at a considerable distance apart at the connecting-point—say, for instance, three feet—the wheels connecting them must also have a diameter of three feet, and, being in the shape of a sphere, would contain an enormous amount of metal. Even when segments only of the gear-wheels are used the spherical pitch-line of the teeth requires a much greater sweep of the arc to complete the change of inclination between two shafts than the improved universal gear which constitutes the subject of this application.

To enable others skilled in the art to make and use my invention, I will now describe it by reference to the accompanying two sheets of drawings, in which—

Figure 1:
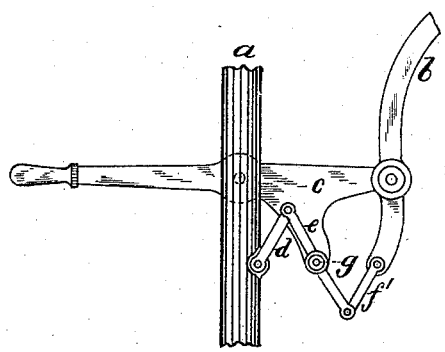
Figure 2:
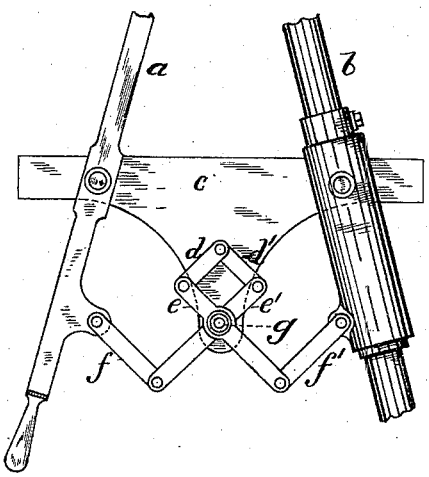
Figure 3:
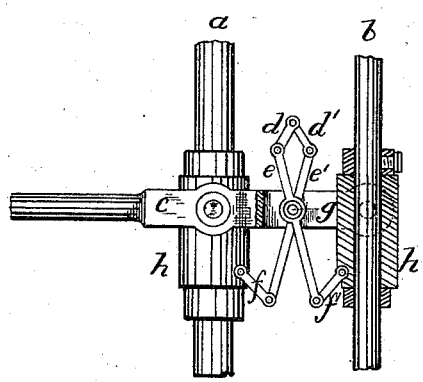
Figure 4:
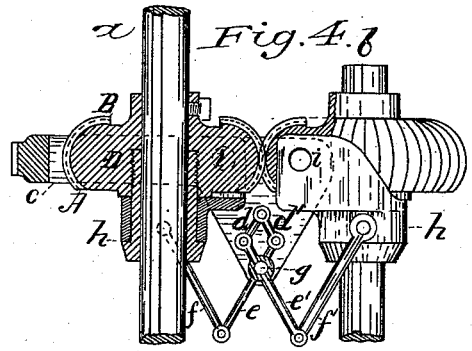
Figure 7:
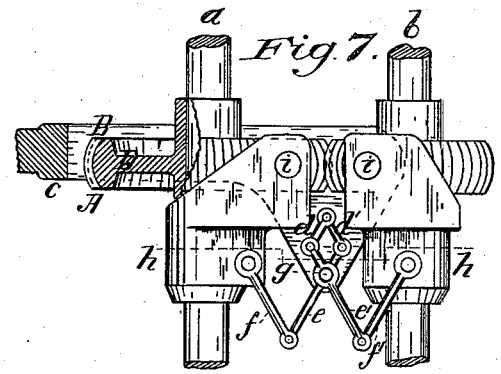
Figure 5:
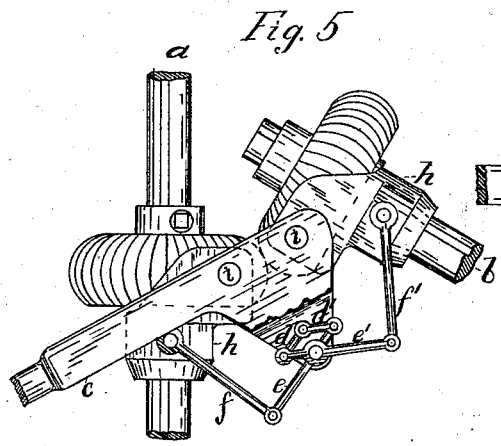
Figure 8:
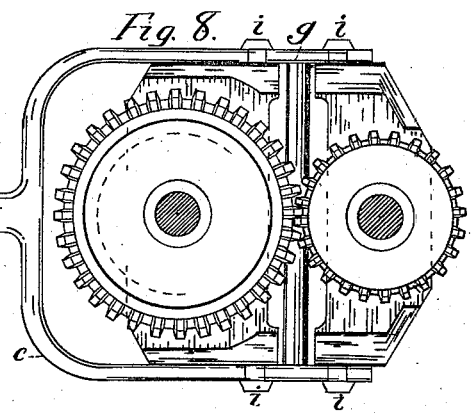
Figure 6:
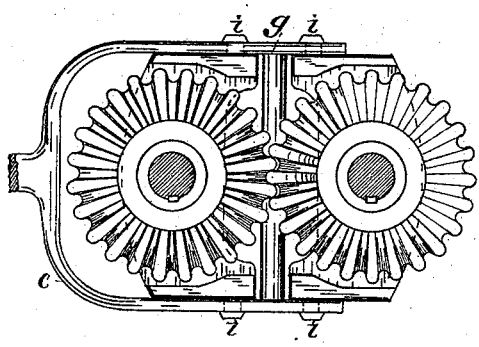
Figure 9:
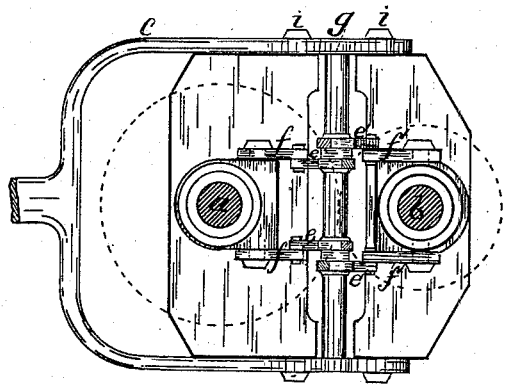

Figure 1 is a view of devices for connecting two non-revoluble shafts. Fig. 2 is a view of devices for connecting a revoluble with a non-revoluble shaft. Fig. 3 is a view of devices for connecting two revoluble shafts. Fig. 4 is an elevation, partly in section, of my improved universal-gear joint with gear-wheels having a globular or spheroidal pitch-line of teeth, and with axes parallel to each other. Fig. 5 is an elevation of the same gear with the axes at an angle to each other. Fig. 6 is a plan view of the gear shown in Figs. 4, 5. Figs. 7, 8, and 9 are respectively elevation, plan, and bottom views of another pair of gear-wheels differing slightly in form.

Like letters of reference indicate like parts in each.

Figs. 1, 2, and 3 show modifications of devices of the same principle for connecting two shafts, *a b*, so that they can be parallel with or at an angle of inclination to each other. There are two separate link-connections. The first connection is composed of a link or bar, *c*, connected pivotally with each shaft when the shafts are not revoluble, as shown in Fig. 1, or with their sleeves or bearings when they are revoluble, as shown in Fig. 3. The second connection is formed of several links pivotally connected together, and when stretched in a straight line is longer than the first connection, *c*. It may be formed of three links, *d e f'*, as shown in Fig. 1, *d* being pivoted to the shaft *a*, *e* journaled on *c* at *g* and pivoted at its ends to the links *d* and *f'*, and *f'* being pivoted to the shaft *b*; or it may be formed of six links, *d e f' d' e' f*, as shown in Figs. 2 and 3, the links *e e'* being mounted on the bar *c* by the pin or journal *g*, the links *d d'* being pivoted together and to the upper ends of the links *e e'*, and the links *f f'* pivoted to the lower ends of the links *e e'*, and to the shafts *a b* or their bearings *h h*. The pivot or journal *g* is equidistant from the pivotal connections between the shafts *a b* and the bar *c*. Furthermore, the links of the second connection bear such relations to each other that those divided by the pivot *g* on the direct connection *c* form symmetrical figures or lines. Thus in Fig. 1 the link *f'* is equal to *d*, and the link *e* is divided by the pivot into two parts of equal length, and in Figs. 2 and 3 the respective links *f f'*, *d d'*, and *e e'* are equal in length. A consequence of this construction is that when the two shafts are changed from parallel to inclined positions the angles formed by the respective shafts with the direct connecting-link are always equal; or, in other words, if the two shafts were to be prolonged until they met, they would form a triangle with the direct link *c* as a constant base and the shafts *a* and *b* as sides of equal but varying length, varying according to the degree of inclination. Such relations remain unchanged whether one or both of the shafts is capable of being inclined toward the other, and it makes no difference which link or shaft is used as a lever to effect a change of inclination. Either the bar *c* or one of the shafts must be fixed in order to support the movable elements of the combination.

In universal gears the two gear-wheels, which can have a spherical, a spheroidal, elliptical, or an irregular pitch-line of their teeth, have to be guided in such a way that their teeth which are at different places of different sizes of wheels shall always gear properly, and so that they cannot slip one upon the other. The constructions for uniformly changing the degree of inclination between two shafts, hereinbefore described, answer this purpose, provided the direct link-connection which unites the two shafts is connected with the bearings of the shaft at a place which has a definite relation to the pitch-line of the teeth.

In Figs. 4 to 9 I show a new kind of spheroidal or globular gear-wheel, which has a spheroidal or globular pitch-line of the teeth formed by a sector of a circle, A B D, Figs. 1 and 4, placed in the plane of the polar axis of the gear, and being guided with the center of the sector-circle along on the outer side of a circle (see dotted lines in Fig. 5) formed by a radius in a plane at right angles to the polar axis of the gear-wheel. The gear-wheel thus made has a greater lateral than polar diameter, being of flattened shape. This gear-wheel, with a spheroidal or globular pitch-line of the teeth, has many advantages over universal gear-wheels having a spherical pitch-line. By its use universal gearing can be produced of any diameter in which the gear-wheels consist only of a common disk or a cog-wheel of any diameter, the rim of which, however, is provided with teeth having the desired globular pitch-line. Another advantage of the universal gear with globular pitch-line is that this construction is applicable to the construction of universal-gear connections driving shafts at different speeds, as shown in Figs. 7, 8, where the gear-wheels are of different diameters. This is only possible when the diameter of the circle forming the pitch-line of the teeth is considerably smaller than the diameter of the gear-wheel itself, which is impossible for gear-wheels with spherical pitch-line.

In Fig. 4, $a$ and $b$ are the revoluble shafts, $a$ being supposed to be mounted in fixed bearings. $c$ is the direct link-connection; $d\ d'\ e\ e'\ f\ f'$, the second link-connection, connected with the direct link $c$ by the pivot $g$. $h\ h$ are the bearings to which the link-connections are attached, and in which the gear-wheels, with their shafts, revolve. The gear-wheels have a globular pitch-line formed by the sector A B D around a circle of the radius, (D to axis,) the sector placed in the plane of the axis being moved with the point D along the outer side of the circle. The link $c$ connects with the bearings $h\ h$ by pivots $i$, situated at the point of nearest approach of the two circles along which the sectors A B D, forming the pitch-lines, are guided. In Fig. 5 the same gear-connection is represented when the shafts are inclined to each other. In Fig. 6 I show the bearings $h$ provided at two sides with the pivots $i$, so that the link $c$ is a double link, inclosing the gear-wheels and the bearings $h$ on two sides. This double link forms the functions of a single one, and I have referred to it as being only one. In the same way the second link-connection formed by the links $f\ f'\ e\ e'\ d\ d'$ may be double or it may be single.

Figs. 7, 8, and 9 represent the arrangement for universal-gearing connections with gear-wheels having a globular pitch-line and different diameters. Both gear-wheels, whether of the same diameter as in Fig. 4, or when of a different diameter, as in Figs. 7, 9, must have the same circle-sector to form the pitch-line of their teeth.

An important feature in my universal-gearing connections is that the gear-wheels can be secured at any place in the length of the shafts, and the connection does not need to be made at the ends, so that I can take off positive revolving motion from a continuous shaft at any convenient place or places and use such positive revolving motion in any direction allowed by the universal-gearing joint.

As stated before, one of the shafts of the connecting-links in each of my universal-gearing joints has to be fixed so as to support the other movable elements of the combination, and a second link of the combination is chosen for lever $k$ to operate, regulate, or guide the movements of the joint. If such lever is connected with a ratchet-wheel, a toothed rod, an eccentric, or with any other device to lift or lower it repeatedly in certain intervals of time, this motion will be communicated to the inclinable shaft or revoluble axle, and will cause it to change its inclination in the same interval of time; or if the lever be connected with a screw, weight, spring, or other device to secure it in a certain place, the inclination of the inclinable shaft will likewise be secured.

This improvement is applicable to a wide range of machines for mechanical, agricultural, printing, and other purposes.

Having thus described my invention, what I claim, and desire to secure by Letters Patent, is—

1. A universal-gearing joint consisting in a combination of two spheroidal gear-wheels or segments thereof, provided with teeth having a globular pitch-line, with shafts in line with or passing through the polar axis of the gear-wheels, revoluble in bearings which are linked together by pivotal link-connections, and are capable of being operated by a lever forming a link of the connection, substantially as and for the purposes described.

2. A universal-gearing joint consisting of a combination of two universal gear-wheels or segments thereof of a different diameter with two shafts and bearings in which the gear-wheels revolve, connected together by pivotal link-connections in such a way as to cause the gear-wheels to meet with respectively equal degrees of inclination of their polar and equatorial axes, substantially as and for the purposes described.

3. A device for operating universal-gearing wheels with their axles, consisting in a combination of two link-connections between the bearings attached to different parts of the bearings in which the gear-wheels revolve, the first connection being made by a link-connection connecting pivotally directly with both bearings, and the second connection being made by several links connecting pivotally with their ends, and when stretched in line being longer than the link forming the first or direct link-connection, substantially as and for the purposes described.

4. A device for operating a universal-gearing joint, consisting of a stationary axle or shaft passing through or in line with a universal gear-wheel, and being connected with the second universal gear-wheel and its axle by connecting-links, one of which forms a lever for changing the inclination of the shafts, substantially as and for the purposes described.

5. A device for changing uniformly the degree of inclination between two shafts, consisting of two separate link-connections attached to the shafts or their bearings at points respectively equidistant, the first connection being formed by one link pivoted to both shafts or their bearings, and the second connection consisting of several links pivoted together and to the shafts, and centrally pivoted to the first connection at a point equidistant from its connection to the shafts, so as to form symmetrical figures on both sides of such pivotal point, substantially as and for the purposes described.

In testimony whereof I have hereunto set my hand this 5th day of April, A. D. 1884.

HERMANN SCHULZE-BERGE.

Witnesses:
 W. B. CORWIN,
 JNO. K. SMITH.